US011631231B2

(12) United States Patent
Burke et al.

(10) Patent No.: US 11,631,231 B2
(45) Date of Patent: Apr. 18, 2023

(54) TIME-LAPSE CAMERA AND METHODS RELATED THERETO

(71) Applicant: VADE Group, Inc., Durham, NC (US)

(72) Inventors: Christian Burke, Raleigh, NC (US); Matthew Schaefer, Raleigh, NC (US); Ritwik Pavan, Raleigh, NC (US)

(73) Assignee: Vade Group, Inc., Durham, NC (US)

( * ) Notice: Subject to any disclaimer, the term of this patent is extended or adjusted under 35 U.S.C. 154(b) by 0 days.

(21) Appl. No.: 17/248,928

(22) Filed: Feb. 12, 2021

(65) Prior Publication Data

US 2021/0248404 A1 Aug. 12, 2021

Related U.S. Application Data

(60) Provisional application No. 62/975,530, filed on Feb. 12, 2020.

(51) Int. Cl.
| | |
|---|---|
| *G06V 10/147* | (2022.01) |
| *G08G 1/14* | (2006.01) |
| *H04L 67/12* | (2022.01) |
| *G06V 20/52* | (2022.01) |
| *G06F 18/22* | (2023.01) |
| *H04N 23/54* | (2023.01) |
| *H02S 99/00* | (2014.01) |

(52) U.S. Cl.
CPC ............ *G06V 10/147* (2022.01); *G06F 18/22* (2023.01); *G06V 20/52* (2022.01); *G08G 1/14* (2013.01); *H04L 67/12* (2013.01); *H04N 23/54* (2023.01); *G06V 2201/08* (2022.01); *H02S 99/00* (2013.01)

(58) Field of Classification Search
CPC .. G06K 9/209; G06K 9/00771; G06K 9/6201; G06K 2209/23; G08G 1/14; H04L 67/12; H04N 5/2253; H04N 5/2251; H02S 99/00
See application file for complete search history.

(56) References Cited

U.S. PATENT DOCUMENTS

| | | | | |
|---|---|---|---|---|
| 2013/0147962 | A1* | 6/2013 | Siann | H04L 67/12 |
| | | | | 348/159 |
| 2017/0023612 | A1* | 1/2017 | Brown | H04Q 9/00 |
| 2017/0039424 | A1* | 2/2017 | Nerayoff | G06T 7/32 |
| 2017/0076156 | A1* | 3/2017 | Borel | G11B 27/28 |
| 2017/0289450 | A1* | 10/2017 | Lemberger | G08B 13/19682 |
| 2018/0174453 | A1 | 6/2018 | Hohenacker | |
| 2020/0272950 | A1* | 8/2020 | Xu | G08G 1/146 |
| 2021/0279476 | A1* | 9/2021 | Nicholson | G08G 1/166 |

FOREIGN PATENT DOCUMENTS

| | | |
|---|---|---|
| AU | 2015205954 A1 | 8/2015 |
| KR | 100795141 | 1/2008 |

OTHER PUBLICATIONS

International Search Report and Written Opinion dated May 27, 2021, for International Application No. PCT/US2021/070154, 8 pages.

* cited by examiner

*Primary Examiner* — Nasim N Nirjhar
(74) *Attorney, Agent, or Firm* — Frost Brown Todd LLP

(57) ABSTRACT

Image capture devices for monitoring parking at various geographic locations and systems for monitoring parking are described herein.

20 Claims, 3 Drawing Sheets

TIME-LAPSE CAMERA AND METHODS RELATED THERETO

CROSS-REFERENCE TO RELATED APPLICATIONS

This application claims priority from U.S. Provisional No. 62/975,530 entitled "A Solar Powered Time-lapse Camera With Cellular Connectivity for Remotely Monitoring Parking Space Occupancy," filed Feb. 12, 2020 the entirety of which is hereby incorporated by reference.

GOVERNMENT INTERESTS

Not applicable

PARTIES TO A JOINT RESEARCH AGREEMENT

Not applicable

INCORPORATION OF MATERIAL ON COMPACT DISC

Not applicable

BACKGROUND

Remotely obtaining a visual of parking spaces to monitor parking space occupancy requires a connection to an independent source of power. Therefore, remotely monitoring the occupancy of many geographically dispersed parking spaces is expensive and logistically complicated. For example, cameras that transmit video feeds using a cellular connection require more power and either a direct source of wired power or a separate, larger solar panel installation in close proximity to the camera. This makes it prohibitively expensive and time consuming to remotely monitor parking space occupancy at a large scale.

Instead of transmitting a constant video feed, this invention transmits images intermittently at custom time intervals and enters a low power resting state in between image transmissions to reduce power consumption. This enables the cameras to be powered by a small solar panel attached to the camera unit itself, reducing both the cost and time consumption of installation, making it possible to remotely monitor parking space occupancy in many more geographical and environmental circumstances.

SUMMARY OF THE INVENTION

Various embodiments of the invention are directed to image capture devices for monitoring parking that include a camera, which encompasses various types of image capture devices, a microprocessor operably coupled to the camera and configured to cause the imaging device to intermittently capture still images, and a transmitter operably coupled to the microprocessor configured to transmit the still images via the internet. In some embodiments, the devices may further include a solar panel configured to produce about 3 watts (W) to about 10 W, and in some embodiments, a solar panel having a surface area for collecting light of less than about 15 square inches ("in$^2$"). In certain embodiments, the devices may further include a housing sized to enclose the imaging device, microprocessor, and transmitter and, in some embodiments, a mounting device configured to couple the housing to a structure.

Further embodiments are directed to image capture devices for monitoring parking that include a camera, which encompasses various types of image capture devices, a microprocessor operably coupled to the camera and configured to cause the imaging device to intermittently capture still images, a transmitter operably coupled to the microprocessor configured to transmit the still images via the internet, and a solar panel configured to produce about 3 watts (W) to about 10 W. In some embodiments, the solar panel may have a surface area for collecting light of less than about 15 square inches ("in$^2$"). In some embodiments, the devices may include a housing sized to enclose the imaging device, microprocessor, and transmitter, and in some embodiments, a mounting device configured to couple the housing to a structure.

Other embodiments are directed to a system for monitoring parking including an image capture device having a camera, which encompasses various types of image capture devices, a microprocessor operably coupled to the imaging device, a transmitter operably coupled to the microprocessor configured to transmit the still images via the internet and a solar panel configured to produce about 3 watts (W) to about 10 W; a computer system couple to a computer network and connected to the image capture device, the computer system having a processor configured to: collect still images transmitted from the transmitter, identify vehicles in the still images, and determine the availability of parking in an area associated with the image capture device. In some embodiments, the image capture device may include a solar panel having a surface area for collecting light of less than about 15 square inches ("in$^2$").

The system of claim 10, further comprising a housing sized to enclose the imaging device, microprocessor, and transmitter. In some embodiments, the devices may include a housing sized to enclose the imaging device, microprocessor, and transmitter, and in some embodiments, a mounting device configured to couple the housing to a structure. In some embodiments, the processor may be configured to compare parking data from the image capture device with parking data from other image capture devices. In some embodiments, the processor may be configured to compare parking data from the image capture device with historical parking data. In certain embodiments, the computer network may be the internet. In certain embodiments, the system may further include an application programming interface configured to transmit parking data to cities, parking enforcement vendors, parking apps, and wayfinding solutions.

DESCRIPTION OF THE DRAWINGS

Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known process operations have not been described in details so as to not unnecessarily obscure the present invention.

DETAILED DESCRIPTION

Figure 1:
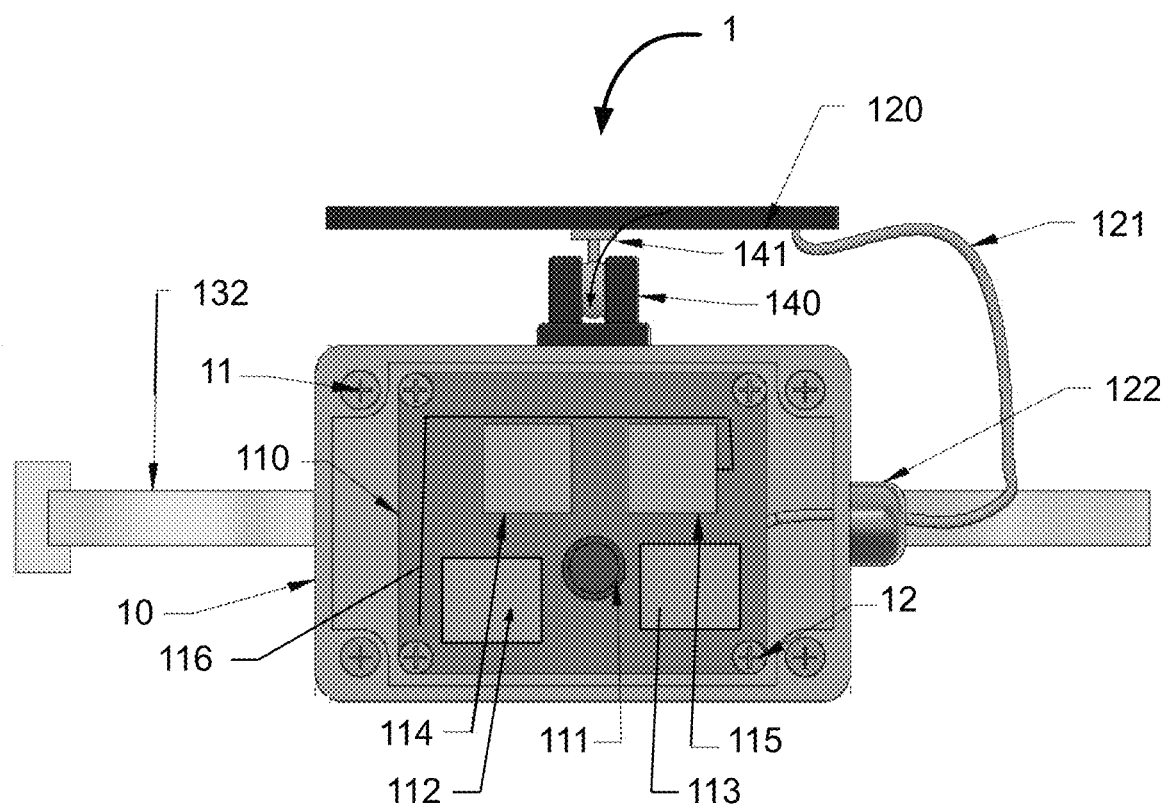
FIG. 1 is an illustration of a monitoring device encompassed by the invention.

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

Where a range of values is provided, it is intended that each intervening value between the upper and lower limit of that range and any other stated or intervening value in that stated range is encompassed within the disclosure. For example, if a range of 1 µm to 8 µm is stated, 2 µm, 3 µm, 4 µm, 5 µm, 6 µm, and 7 µm are also intended to be explicitly disclosed, as well as the range of values greater than or equal to 1 µm and the range of values less than or equal to 8 µm.

All percentages, parts and ratios are based upon the total weight of the topical compositions and all measurements made are at about 25° C., unless otherwise specified.

The singular forms "a," "an," and "the" include plural referents unless the context clearly dictates otherwise. Thus, for example, reference to a "polymer" includes a single polymer as well as two or more of the same or different polymers; reference to an "excipient" includes a single excipient as well as two or more of the same or different excipients, and the like.

The word "about" when immediately preceding a numerical value means a range of plus or minus 10% of that value, e.g, "about 50" means 45 to 55, "about 25,000" means 22,500 to 27,500, etc, unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g, more than 49.5 to less than 52.5. Furthermore, the phrases "less than about" a value or "greater than about" a value should be understood in view of the definition of the term "about" provided herein.

By hereby reserving the right to proviso out or exclude any individual members of any such group, including any sub-ranges or combinations of sub-ranges within the group, that can be claimed according to a range or in any similar manner, less than the full measure of this disclosure can be claimed for any reason. Further, by reserving the right to proviso out or exclude any individual substituents, analogs, compounds, ligands, structures, or groups thereof, or any members of a claimed group, less than the full measure of this disclosure can be claimed for any reason. Throughout this disclosure, various patents, patent applications and publications are referenced. The disclosures of these patents, patent applications and publications in their entireties are incorporated into this disclosure by reference in order to more fully describe the state of the art as known to those skilled therein as of the date of this disclosure. This disclosure will govern in the instance that there is any inconsistency between the patents, patent applications and publications cited and this disclosure.

For convenience, certain terms employed in the specification, examples and claims are collected here. Unless defined otherwise, all technical and scientific terms used in this disclosure have the same meanings as commonly understood by one of ordinary skill in the art to which this disclosure belongs.

Various embodiments of the invention are directed to image capture devices for monitoring high traffic areas such as parking lots and methods related thereto. In some embodiments, the image capture devices may include a camera that is operably connected to a solar panel as its sole source of electricity, and in particular embodiments, the camera may be a time-lapse camera. Such image capture devices may be mounted in, for example, parking areas and images captured by the devices may be used to monitor parking activity and availability.

The image capture devices of various embodiments may at least include a camera operably connected to a transmitter capable of transmitting captured images to a computer system that can display and/or analyze the captured images. In some embodiments, the camera may capture images intermittently and may enter a low power resting state between image capture and transmission. In some embodiments, intermittent image capture may occur one every 30 seconds, once every minute, once every 2 minutes, once every 5 minutes, once every 10 minutes, once every 15 minutes, once every 30 minutes, once per hour or any time period between these example times. In certain embodiments, intermittent image capture may occur at custom time intervals. For example, in some embodiments, the camera may capture images once per minute during the day and enter the resting state during the night. In other embodiments, the camera may capture images once every 30 seconds or once every minute during high traffic/high parking turnover periods, such as rush hour, once every 5 or 10 minutes during low traffic/low parking turnover times, such as during working hours, and once every hour or never during extremely low traffic/low parking turnover times, such as night. In still other embodiments, intermittent image capture may be determined based on local activity. For example, image capture may occur more quickly before local events like sporting events.

When in the resting state, the camera may be completely powered down, enter a low power mode in which only necessary components, such as, for example, a clock or microcontroller that wakes up the system at specific times, a motion detector, and the like and combinations thereof, or the camera may be completely powered down in some instances and enter a low power mode in others. By reducing the size and frequency of image capture and entering a low power resting state in between image transmissions power consumption may be reduced significantly. This enables the cameras and other image devices to be powered by a smaller solar panel attached to the camera, reducing the cost and time required for installation, making it possible to remotely monitor, for example, parking space occupancy in many more rigorously.

In some embodiments, image capture devices including, for example, a camera, transmitter, solar panel, and battery contained within a housing, and in certain embodiments, the housing may be a waterproof enclosure. In other embodiments, the camera, transmitter, and battery may be contained within a housing and a solar panel may be operably attached to the housing.

As illustrated in FIG. 1, the image capture devices 1 of some embodiments may include various electrical components held within the waterproof enclosure 10. The electrical components may include, for example, a camera 111 operably connected to a circuit or motherboard 110. The camera 111 and circuit or motherboard 110 can be connected by wires, soldered connections, clips, fittings, or any means for connecting components of an electrical system known in the art, and each of the camera 111 and circuit or motherboard 110 can be attached to the enclosure using, for example, screws 12. In some embodiments, the camera 111 may be positioned to face a clear section of the enclosure 10, and in other embodiments, the camera 111 or a portion thereof, such as a lens, may protrude from the enclosure.

The term "camera" meant to broadly encompass image sensors and imagers. An image sensor or imager is a sensor that detects and conveys information used to make an image by converting the variable attenuation of light waves (as they pass through or reflect off objects) into signals, small bursts of current that convey the information. Image sensors are used in electronic imaging devices of both analog and digital types, which include digital cameras, camera modules, night vision equipment, thermal imaging devices, radar, sonar, and the like and combinations thereof. Cameras described in embodiments of the invention encompass all such imaging devices and imagers.

The two main types of electronic image sensors are the charge-coupled device (CCD) and the active-pixel sensor (CMOS sensor). Both CCD and CMOS sensors are based on metal-oxide-semiconductor (MOS) technology, with CCDs based on MOS capacitors and CMOS sensors based on MOSFET (MOS field-effect transistor) amplifiers. Analog sensors for invisible radiation tend to involve vacuum tubes of various kinds, while digital sensors include flat-panel detectors. Such image sensors are encompassed by the invention.

The circuit board or motherboard 110 may serve as the base for various electrical components that can be soldered on to the circuit board or motherboard 110. For example, in some embodiments, the electrical components may include a battery 112 such as, for example, a lithium-polymer battery that stores electricity from a solar panel and powers the device. The battery 112 may be operably connected to a power circuit 113 that is configured to control collection and distribution of electricity to ensure the battery does not become overcharged. The electrical components may further include a microprocessor 114, a modem 115, and in certain embodiments, a cellular modem, and an antenna 116. The microprocessor 114 may obtain time information from the modem 115 and cause the camera 111 to capture an image of the device's surroundings. The modem 115 may transmit the captured images to a system server or control center where they are analyzed and/or the captured images may be saved to a memory chip on the circuit board or motherboard 110.

The image capture devices 1 may be powered using conventional hard wiring or, in certain embodiments, by a solar panel 120 that may be attached to or integrated into the enclosure 10 to passively trickle charge the device. The solar panel 120 may be connected to the circuit board or motherboard 121 by wires that enter the enclosure through a waterproof port 122. In such embodiments, the solar panel 120 may be capable of producing about 2 Watts ("W") to about 12 W, about 3 W to about 10 W, about 4 W to about 8 W, or any range or individual value encompassed by these ranges. Such solar panels 120 may have a size of less than about 15 square inches ("$in^2$"), less than about 12 $in^2$, less than about 10 $in^2$, about 2.5 $in^2$ to about 15 $in^2$, about 3.75 $in^2$ to about 12.5 $in^2$, about 5 $in^2$ to about 10 $in^2$, or any range or individual value encompassed by these ranges. In contrast, security cameras typically require solar panels capable of producing about 15 W to about 20 W to power imaging devices taking continuous video, and these security cameras are often connected to a power source to make up for power deficiencies that occur during use.

In some embodiments, the solar panel 120 may be directly attached to the enclosure 10. In other embodiments, the solar panel may be attached to the enclosure 10 by a joint or hinge 140,141 that allows the solar panel to be articulated and arranged to optimize collection of sunlight. In still other embodiments, the solar panel 120 may be mounted separately from the enclosure 10 allowing the enclosure 10 to be mounted in shade while the solar panel 120 to be mounted in sun. In particular embodiments, the solar panel 120 may be attached to the enclosure 10 by clamp mounts having a ball mount 140, allowing the solar panel 120 to be tilted and rotated in any direction.

Figure 2:
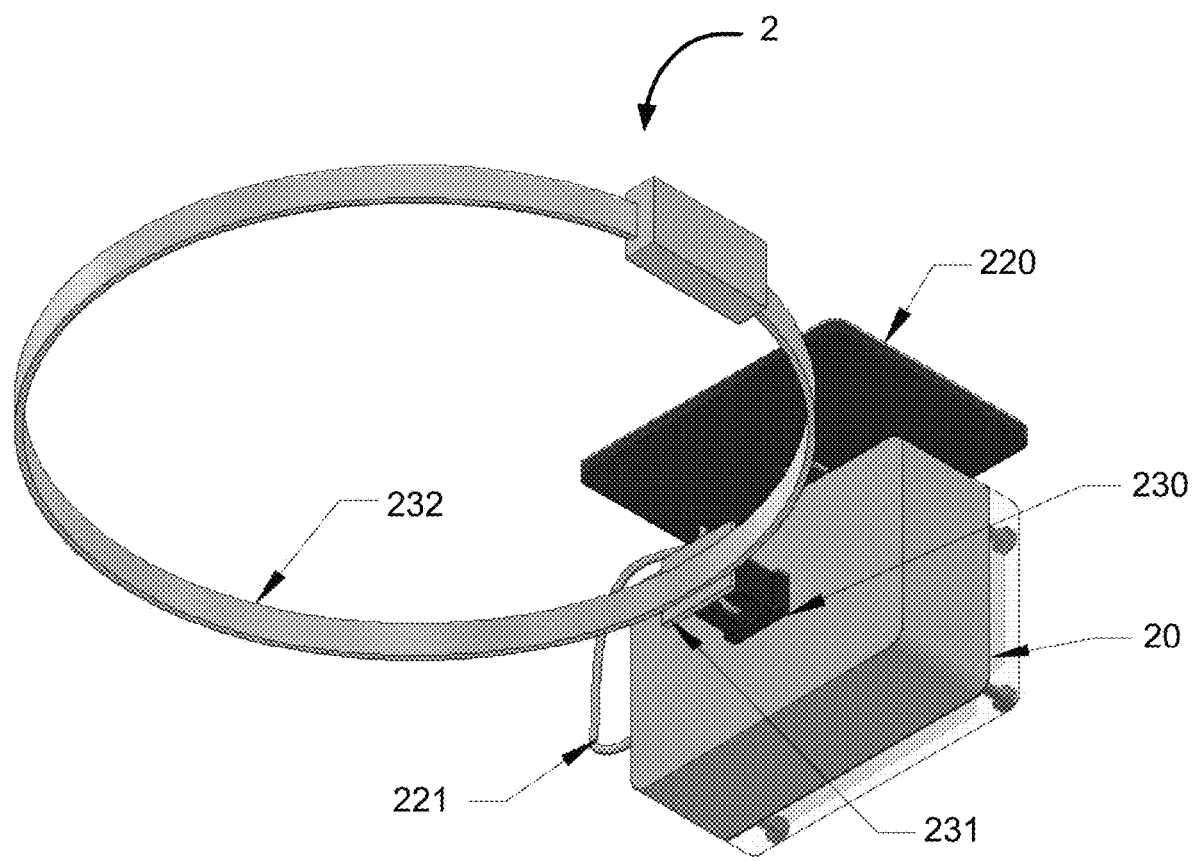
FIG. 2 is an illustration of the reverse side of the monitoring system of FIG. 1.

In some embodiments, the image capture devices 2 may include a mounting system, as illustrated in FIG. 2, having a housing 20 and solar panel 220 connected to a circuit board or motherboard by a wire 221. The mounting system 230 that is operably connected to the housing 20. The mounting system 230 may include, for example, a hinge or ball joint capable of allowing the enclosure to be articulated or rotated to focus on a particular area, and in some embodiments, the mounting system 230 may be motorized, allowing the enclosure to move in a programed pattern or at the direction of a user. The mounting system 230 may be capable of coupling to a structure such as a telephone pole, light pole, wall, building, or cable. For example, in some embodiments, the mounting system 230 may include a plate 231 and strap or clamp 232 used to attach the device to, for example, a light or utility pole. In other embodiments, the plate may include bolts that pass through the plate for attaching the image capture devices 2 to a structure.

Figure 3:
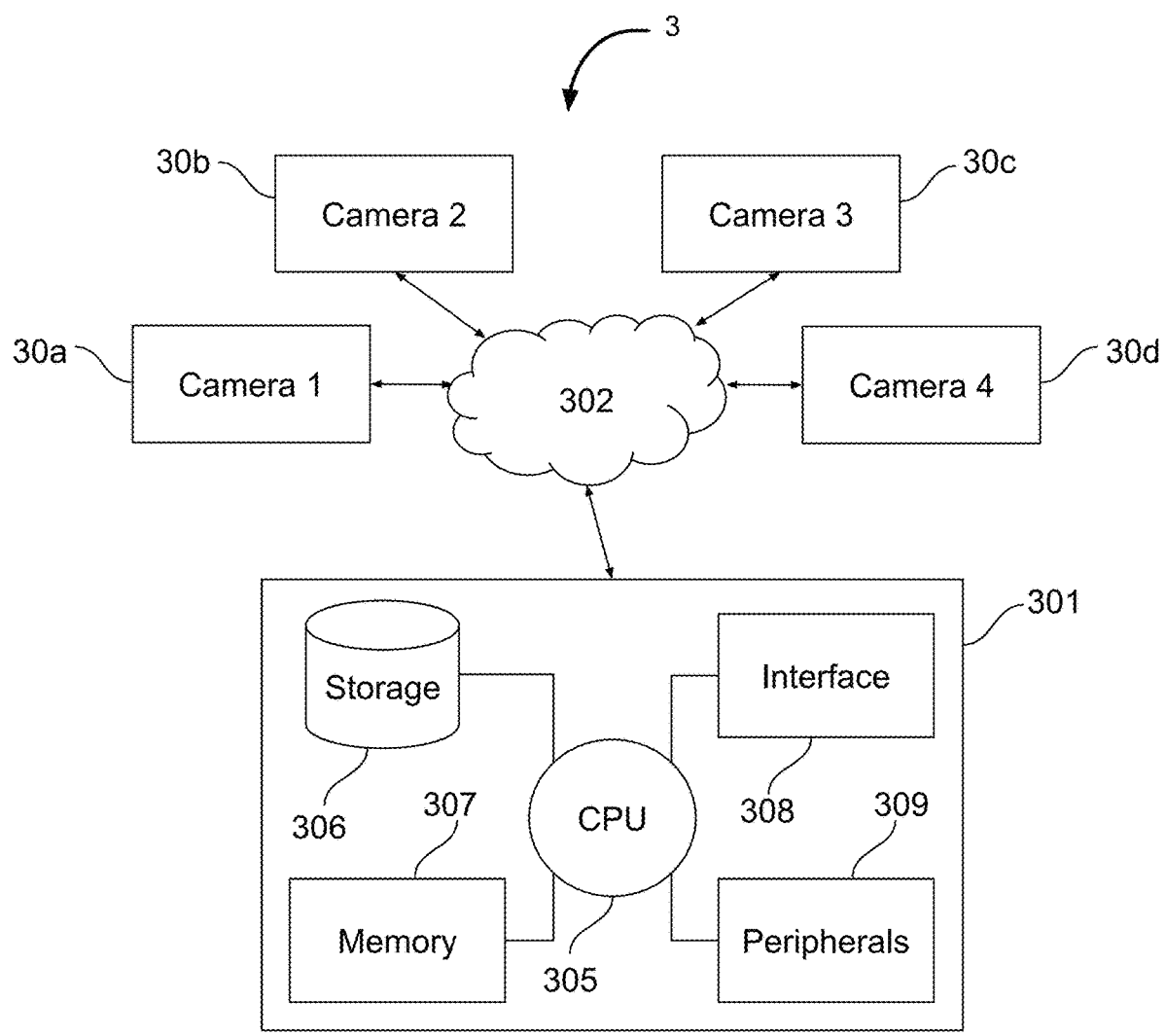
FIG. 3 is a schematic of a computer control system that is programmed or otherwise configured to implement methods provided herein.

Further embodiments are directed to systems that include the image capture devices described above and a control system 3 that analyzes the images captured by one or more image capture devices 30a, 30b, 30c, 30d, as illustrated in FIG. 3. The control system 3 may communicate with the internet 302 via a router used to communicate with the image capture devices by cellular, wi-fi, or other internet transmission means.

In some embodiments, the control system 3 may use computer vision to identify components of the captured images. For example, in some embodiments, the control system may use computer vision to identify vehicles parked in an area under surveillance to produce parking space occupancy data sorted by geographical coordinates. Through a suite of APIs (application programming interfaces), the most recent data can be integrated with cities, enforcement vendors, parking apps, and wayfinding solutions to improve parking management and make it easier for drivers to find parking spaces. Over time, this data can be aggregated to produce analytics such as occupancy levels, duration of parking stays, number of parking stays, and the like. These analytics can be marketed and sold to cities, real estate development companies, and transportation analytics companies to better inform important decisions related to parking infrastructure and management.

The control systems that are programmed to implement the various methods described above. FIG. 3 shows a computer system 301 that is programmed or otherwise configured to monitor the image capture devices described herein. The computer system 301 may include a central processing unit ("CPU," "processor," or "computer processor") 305, and the CPU 305 can be a single core or multi core processor, or a plurality of processors for parallel processing. The computer system 301 may also include memory 306 (e.g., random-access memory, read-only memory, flash memory), electronic storage unit 307 (e.g., hard disk), communication interface 308 (e.g., network adapter) for communicating with one or more other systems, and peripheral devices 309, such as cache, other memory, data storage and/or electronic display adapters. The memory 306, storage unit 307, interface 308 and peripheral devices 309 may be in communication with the CPU 305 through a communication bus (solid lines), such as a motherboard. The storage unit 307 can be a data storage unit (or data repository) for storing data.

The computer system 301 can be operatively coupled to a computer network ("network") 302 with the aid of the communication interface 308. The network 302 can be the Internet, an internet and/or extranet, or an intranet and/or extranet that is in communication with the Internet. The network 302 in some cases is a telecommunication and/or data network. The network 302 can include one or more computer servers, which can enable distributed computing, such as cloud computing. The network 302, in some cases with the aid of the computer system 301, can implement a peer-to-peer network, which may enable devices coupled to the computer system 301 to behave as a client or a server.

The CPU 305 can execute a sequence of machine-readable instructions, which can be embodied in a program or software. The instructions may be stored in a memory location, such as the memory 306. The instructions can be directed to the CPU 605, which can subsequently program or otherwise configure the CPU 305 to implement methods of the present disclosure. Examples of operations performed by the CPU 305 can include fetch, decode, execute, and writeback. The CPU 305 can be part of a circuit, such as an integrated circuit. One or more other components of the system 301 can be included in the circuit. In some cases, the circuit is an application specific integrated circuit (ASIC).

The storage unit 307 can store files, such as drivers, libraries and saved programs. The storage unit 307 can store user data, e.g., user preferences and user programs. The computer system 301 in some cases can include one or more additional data storage units that are external to the computer system 301, such as located on a remote server that is in communication with the computer system 301 through an intranet or the Internet.

The computer system 301 can communicate with one or more remote computer systems through the network 302. For example, the computer system 301 can communicate with remote computer systems of another group of cameras monitoring a different location. Examples of remote computer systems include personal computers, slate or tablet PC's, telephones, Smartphones, or personal digital assistants. The user can access the computer system 301 via the network 302.

Methods as described herein can be implemented by way of machine (e.g., computer processor) executable code stored on an electronic storage location of the computer system 301, such as, for example, on the memory 306 or electronic storage unit 307. The machine executable or machine readable code can be provided in the form of software. During use, the code can be executed by the processor 305. In some cases, the code can be retrieved from the storage unit 307 and stored on the memory 306 for ready access by the processor 305. In some situations, the electronic storage unit 307 can be precluded, and machine-executable instructions are stored on memory 306.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. An algorithm can be implemented by way of software upon execution by the central processing unit 305. The algorithm can, for example, monitor traffic in a particular location by using computer vision to identify vehicles parked in an area under surveillance and produce parking space occupancy data sorted by geographical coordinates. The data can be provided to cities, parking enforcement vendors, parking apps, and wayfinding solutions to improve parking management and make it easier for drivers to find parking spaces. Algorithms can be used to aggregate parking data overtime to provide analytics such as occupancy levels, duration of parking stays, number of parking stays, and the like. These analytics can be marketed and sold to cities, real estate development companies, and transportation analytics companies to better inform important decisions related to parking infrastructure and management.

The invention claimed is:

1. An image capture device for monitoring parking, comprising:
    (a) a camera;
    (b) a transmitter;
    (c) a solar panel configured to be a sole source of electrical energy for the image capture device;
    (d) a mounting system comprising at least one of a strap or clamp, wherein the strap or clamp is movably coupled, using at least one of a hinge or ball joint, to an enclosure configured to house the camera, and
    (e) a microprocessor operably coupled to the camera and transmitter, the microprocessor being configured to:
        (i) identify a current time interval;
        (ii) cause the camera to intermittently capture still images based on the current time interval;
        (iii) obtain local activity information;
        (iv) modify, based on the local activity information, the current time interval; and
        (v) transmit, using the transmitter, the still images to one or more remote computer systems.

2. The device of claim 1, wherein the solar panel is configured to produce about 3 watts (W) to about 10 W.

3. The device of claim 1, wherein the solar panel includes a surface area for collecting light of less than about 15 square inches ("in$^2$").

4. The device of claim 1, further comprising a housing sized to enclose the camera, the microprocessor, and the transmitter.

5. The device of claim 4, further comprising a mounting device configured to couple the housing to a structure.

6. An image capture device for monitoring parking, comprising:
    (a) a camera;
    (b) microprocessor operably coupled to the camera and configured to cause the camera to intermittently capture still images;
    (c) a transmitter operably coupled to the microprocessor configured to transmit the still images;
    (d) a solar panel configured to be a sole source of electricity for the image capture device and to produce about 3 W (W) to about 10 W, and
    (e) a mounting structure coupled to the image capture device via a ball joint and configured to allow the solar panel to be articulated,
    wherein the image capture device is configured to operate in a high-power mode when transmitting the still images to one or more remote computer systems and a low power mode when not transmitting the still images to one or more remote computer systems.

7. The device of claim 6, wherein the solar panel includes a surface area for collecting light of less than about 15 square inches ("in$^2$").

8. The device of claim 6, further comprising a housing sized to enclose the camera, the microprocessor, and the transmitter.

9. The device of claim 8, further comprising a mounting device configured to couple the housing to a structure.

10. A system for monitoring parking, comprising:
    (a) an image capture device having:
        (i) an imaging device;
        (ii) microprocessor operably coupled to the imaging device;
        (iii) a transmitter operably coupled to the microprocessor configured to transmit one or more still images;
        (iv) a solar panel configured to be a sole source of electricity for the image capture device and to produce about 3 watts (W) to about 10 W; and
        (v) a mounting system comprising at least one of a strap or clamp, wherein the strap or clamp is movably coupled, using at least one of a hinge or ball joint, to an enclosure configured to house the imaging device, and
    (b) a remote computer system coupled to a computer network and having a processor configured to:
        (i) collect the one or more still images transmitted from the transmitter;
        (ii) identify vehicles in the one or more still images; and
        (iii) determine an availability of parking in an area associated with the image capture device;
    wherein the image capture device is configured to operate in a high-power mode when transmitting the one or more still images via the computer network and a low power mode when not transmitting the one or more still images via the computer network, and wherein the low power mode is at a lower power consumption rate than the high-power mode.

11. The system of claim 10, wherein the solar panel includes a surface area for collecting light of less than about 15 square inches ("in$^2$").

12. The system of claim 10, further comprising a housing sized to enclose the imaging device, the microprocessor, and the transmitter.

13. The system of claim 12, further comprising a mounting device configured to couple the housing to a structure.

14. The system of claim 10, wherein the processor is configured to compare parking data from the image capture device with parking data from other image capture devices.

15. The system of claim 10, wherein the processor is configured to compare parking data from the image capture device with historical parking data.

16. The system of claim 10, wherein the solar panel is configured to produce about 3 watts (W) to about 10 W.

17. The system of claim 10, further comprising an application programming interface configured to transmit parking data to cities, parking enforcement vendors, parking apps, and wayfinding solutions.

18. The device of claim 1, wherein the camera comprises an electronic image sensor selected from the group consisting of a charge-coupled device and an active-pixel sensor.

19. The device of claim 1, wherein the camera comprises a plurality of cameras, and wherein the microprocessor is further configured to cause the plurality of cameras to intermittently capture still images.

20. The device of claim 1, wherein the local activity information comprise data selected from the group consisting of high traffic data, high parking turnover data, rush hour data, low traffic data, low parking turnover data, working hours data, local event data, sporting event data, and schedule change data.

* * * * *